June 16, 1959  J. E. SMITH  2,890,718
QUICK DISCONNECT UNIT FOR PRESSURIZED SYSTEM
Filed April 25, 1956
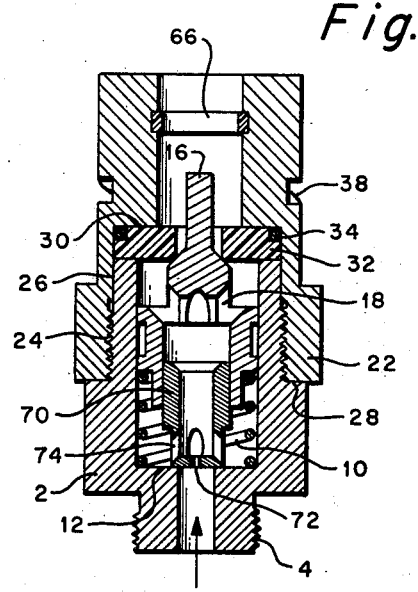
Fig. 2
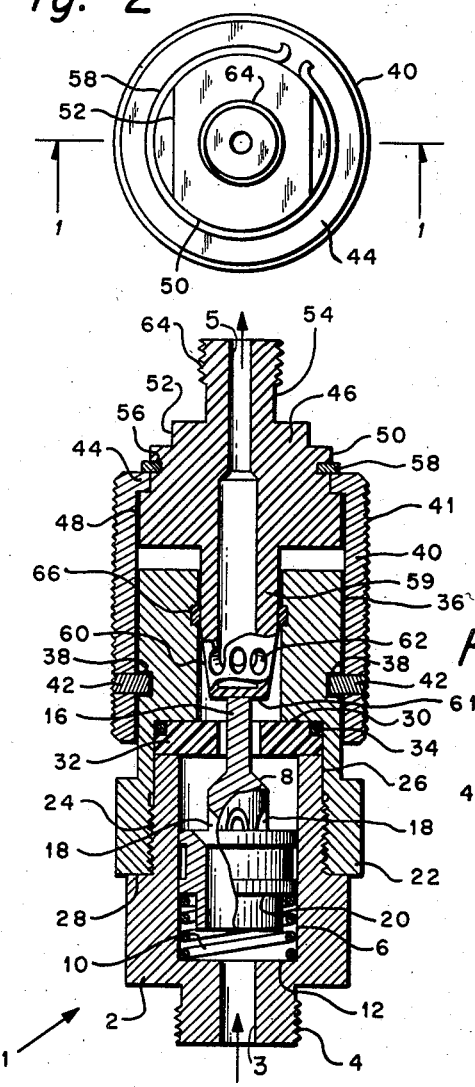
Fig. 1
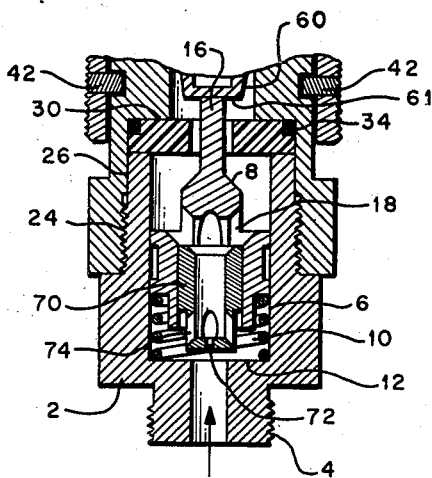
Fig. 5
Fig. 4
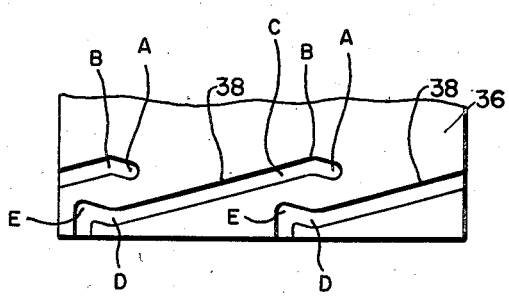
Fig. 3
INVENTOR.
JOHN E. SMITH
BY
*L. M. Smith, Jr.*
ATTORNEYS United States Patent Office 2,890,718
Patented June 16, 1959

2,890,718

QUICK DISCONNECT UNIT FOR PRESSURIZED SYSTEM

John E. Smith, Hatboro, Pa., assignor to the United States of America as represented by the Secretary of the Navy Application April 25, 1956, Serial No. 580,673

6 Claims. (Cl. 137—614.18)

(Granted under Title 35, U.S. Code (1952), sec. 266)

The invention described herein may be used by or for the Government of the United States of America without the payment of any royalties thereon or therefor.

The present invention relates to a pressure disconnect coupling and more particularly to a quick disconnect coupling capable of use in coupling and uncoupling pneumatic or other lines under fluid pressure.

Existing self-sealing disconnects do not permit both coupling and uncoupling under pressure. Those that do permit disconnection under pressure tend to fly apart with some lack of safety, and are hence limited to the smaller sizes.

The present invention utilizes a collar assembly in combination with a spring loaded valve member and a cylindrical cam groove for permitting uncoupling and locking in approximately one hundred degrees of rotation of the collar. A reverse directed edge at the start of the cam provides complete control while trapped air is permitted to escape. The novel arrangement hereinafter described is a relatively simple device which will provide absolutely safe coupling and uncoupling of lines while under pressure as high as 1500 p.s.i. and also providing very effective sealing with the disconnect uncoupled under pressure.

An object of the present invention is the provision of a disconnect unit capable of coupling or uncoupling pneumatic or other fluid lines under pressure.

Another object is to provide a relatively simple apparatus for permitting quick uncoupling of a line under pressure without endangering the safety of the operator.

A further object of the invention is the provision of a quick disconnect unit having excellent self-sealing characteristics when disconnected thereby eliminating the necessity of providing extra valves for this purpose.

A further object of the present invention is the provision of a coupling unit capable of providing coupling and uncoupling of lines under extreme pressures with absolute safety and relative simplicity.

The exact nature of this invention as well as other objects and advantages thereof will be readily apparent from consideration of the following specification relating to the annexed drawings in which:

Fig. 1 shows a section 1—1 in Fig. 2 of one embodiment of the instant invention.

Fig. 2 is an end view of Fig. 1.

Fig. 3 is a developed view of the outer surface of the socket body.

Figs. 4 and 5 show cross section views of a second embodiment of the instant invention in the coupled and uncoupled positions, respectively.

Referring now to the drawings, wherein like reference characters designate like or corresponding parts throughout the several views, there is shown in Figs. 1 and 2 a preferred embodiment of this invention in its assembled, or coupled, form. Quick disconnect unit 1 consists of a cylindrical inlet end 2 having a threaded portion 4 for attaching the tube or pipe carrying the supply of fluid under pressure. The arrow indicates the direction of fluid flow. Inlet end 2 is hollow, having a passage 3 axially therethrough and a widened inner chamber 6 for accommodating a control piston 8 and a spring member 10. End 2 has a shoulder 12 for accommodating spring 10 at one end to bias piston 8 in the opposite direction. Piston 8 also has a rod-like extension 16 at its end opposite the end 20 facing spring 10. A plurality of holes 18 annularly located at the base of extension 16 permits the fluid to pass through the interior of piston 8 which is hollow. Fitted over inlet end 2 is a socket body 22 threaded at 24 for engagement with similar threads on shoulder 26 of inlet end 2.

Socket body 22 is of cylindrical shape and hollow, its interior shape being such that after socket body 22 is fully screwed upon inlet end 2 there is space between the end of inlet end 2 and shoulder 30 of socket body 22 for annular nylon seat 32. Seat 32 fits tightly into the space between inlet end 2 and socket body 22 and has an annular cutout section to permit the use of a seal member 34 therein. The outer surface 36 of socket body 22 is provided with a pair of camming grooves 38 having the particular shape shown in the developed view of Fig. 3. The purpose of the particular shape of these cam slots will be discussed in further detail below in connection with the operation of the disconnect unit.

Fitted over socket body 22 is a collar 40 knurled along its outer surface 41. A pair of pins 42 mounted in said collar 40 directly opposite each other are of such size as to permit them to slide freely in cam slots 38. It will be seen that in order to remove collar 40 from socket body 22, collar 40 would be rotated counterclockwise relative to the showing in Fig. 2. The travel of cam pins 42 in cam slots 38, as shown in Fig. 3, will remove collar 40 from socket body 22.

Collar 40 is a hollow cylindrical member with a lip 44 for mounting an outlet end 46. Outlet end 46 is provided with a passage 5 extending axially therethrough and the stepped outer surfaces 48, 50, 52 and 54. Along surface 50 is an annular slot 56 for mounting a retaining ring 58. Retaining ring 58 maintains outlet end 46 within collar assembly 40 in the manner illustrated. Outlet end 46 is also provided with a cylindrical protrusion 59 having a slight taper 60 at its extreme end. Protrusion 59 is hollow with a solid tip 61. A plurality of holes 62 along tapered surface 60 permits flow of the high pressure fluid between the inlet and outlet ends of the disconnect shown in Fig. 1.

When collar 40 is screwed tightly on socket body 22, solid tip 61 of protrusion 59 engages the rod-like extension 16 of piston 8 and lifts the latter away from nylon seat 32 permitting the flow of a fluid between piston 8 and seat 32. Thus, when the disconnect is in its coupled state, as shown in Fig. 1, fluid entering inlet end 2 will pass through the interior of piston 8, through openings 18, through the space between the seat 32 and extension 16, through openings 62, and thence through the central passageway of outlet end 46. A seal 66 is mounted between protrusion 59 and the inner surface of socket body 22 to prevent passage of fluid through the space between these two elements.

When it is desired to uncouple the unit under pressure, collar 40 is rotated in a counterclockwise direction relative to Fig. 2. As best seen in Fig. 3, showing a developed view of the cam slot 39 inverted as compared to the other views, cam pins 42 are initially located at A. The first slight counterclockwise movement of collar 40 moves the latter inwardly because of the slope of the cam slots 38 up to point B. This reverse slope is a safety feature designed to prevent piston 8 under the urging of spring 10 from disengaging collar 40. Further rotation of collar 40 moves the latter axially away from inlet end 2 as pins 42 slide down the relatively slight slope of cam slots 38. At some point C along this slope, the tapered seating surface of piston 8 comes into engagement with seat 32, thereby sealing off the high pressure source at this point. Between points C and D, cylindrical protrusion 59 comes clear of seal 66 and the tapered portion 60 is opposite the seal 66, permitting exhaust of trapped air. At point D, cam slots 30 change direction for a short interval of distance. With pins 42 opposite E, collar 40 is released completely.

Figs. 4 and 5 show a slight modification of the arrangement described above for the purpose of damping interference due to pressure waves caused by irregularity of flow in the lines to the points of use. A valve piston 70 is located within the interior cavity of control piston 8 and may slide freely therein. Piston 70 is open at the end facing openings 18 and closed at its opposite end thereof except for a small damping hole 72. A plurality of annular openings 74 is provided in the outer wall of piston 70 adjoining its closed end.

As shown in Fig. 4, valve piston 70 is normally at its extreme downstream position due to the positive flow of fluid (shown by arrow) through the disconnect when collar 40 is in its operative position. When conditions abruptly change at the point of use due to changes in demand and flow, a pressure wave may be formed which will oscillate within the closed system. Slide valve piston 70 moves to its extreme upstream position when the wave is directed opposite the normal direction of flow and thereby blocks the opening in inlet end 2. The small opening 72 will permit the shockwave to pass through but at a greatly dampened rate.

It is thus seen that applicant has provided a novel disconnect unit which is capable of quick and accurate connection and disconnection in a pressure line. The device herein described has excellent safety characteristics and is capable of acting in lines having pressures of very high values. The device also has the advantages of simplicity in construction and economy.

Various modifications are contemplated and may obviously be resorted to by those skilled in the art without departing from the spirit and scope of the invention, as hereinafter defined by the appended claims, as only preferred embodiments therefor have been disclosed.

What is claimed is:

1. In a conduit coupling device, inlet means having a central bore therethrough and an enlarged cavity at one end thereof, intermediate coupling means for engagement with said inlet means at said cavity end, said coupling means including cam guide means, valve seat means between said inlet and intermediate coupling means, hollow movable valve means within said cavity biased against said seat for closing said central bore to flow, outlet means for engaging with said intermediate means including cam follower means for cooperating with said cam guide means, said outlet means including further means to raise said valve means away from said seat to permit flow through said coupling device when said intermediate coupling and outlet means are fully engaged, and damping means for limited movement within said valve means for restricting the flow of reverse pressure waves through said coupling device.

2. In a conduit coupling device, inlet means having a central bore therethrough and an enlarged cavity at one end thereof, intermediate coupling means for engagement with said inlet means at said cavity end, said coupling means including cam guide means, valve seat means between said inlet and intermediate coupling means, hollow movable valve means within said cavity biased against said seat for closing said central bore to flow, outlet means for engaging with said intermediate means including cam follower means for cooperating with said cam guide means and a protrusion for contacting said valve means, said protrusion forcing said valve means away from said seat to permit flow through said coupling device when said intermediate coupling and outlet means are fully engaged, and damping valve means for limited movement within said valve means for restricting the flow of reverse pressure waves through said coupling device.

3. In a conduit coupling device, inlet means having a central bore therethrough and an enlarged cavity at one end thereof, intermediate coupling means for engagement with said inlet means at said cavity end, said coupling means including cam guide means, valve seat means between said inlet and intermediate coupling means, hollow movable valve means within said cavity biased against said seat for closing said central bore to follow, outlet means for engaging with said intermediate means including cam follower means for cooperating with said cam guide means, said outlet means including further means to raise said valve means away from said seat to permit flow through said coupling device when said intermediate coupling and outlet means are fully engaged, and damping means for limited movement within said valve means between a first, nonrestricting position when flow through said device is in its normal direction and a second, flow-restricting position when flow is reversed.

4. A fluid pressure conduit coupling comprising, in combination, an inlet member having a central passageway, an intermediate member connected to said inlet member having a central passageway, said central passageways cooperating to provide continuous passage through said conduit coupling, a valve seat disposed in said continuous passage, movable hollow valve means biased against said seat for normally closing said continuous passage to flow, an outlet member for adjustable engagement with said intermediate member including first means to raise said valve means away from said valve seat to permit flow through said continuous passage when said outlet member is fully engaged and second means to release fluid under pressure entrapped in said continuous passage downstream of said valve seat just before said outlet member is fully detached from said intermediate member, and damping means for limited movement within said hollow valve means for restricting the flow of reverse pressure waves through said coupling device.

5. A fluid pressure conduit coupling assembly comprising, in combination, an elongated generally cylindrical first inlet coupling means having a first central bore therethrough and a first circular surface adjacent one end thereof, an annular sealing means disposed within said first central bore adjacent one end thereof, an annular valve seat means disposed within the first central bore intermediate the ends thereof, movable valve means retained within the first central bore biased against said valve seat means for closing said central bore to fluid flow therethrough, a generally cylindrical second outlet coupling means having a second central bore therethrough and a second circular surface adjacent one end thereof for closely interfitting engagement with the first circular surface on said input coupling means, elongated projecting means secured at its base end to said outlet coupling means circumferentially of said second central bore and positioned so that its base end first sealably engages said sealing means and its other end subsequently engages and displaces said valve means from said valve seat means when said inlet coupling means and said outlet coupling means are operably interconnected to permit fluid flow through said conduit coupling assembly, and releasable connecting means for operably interconnecting said input coupling means and said output coupling means including cam follower means projecting radially from the circular surface of one of said coupling means, and substantially elongated camming means for engagement with said cam follower means extending around the circular surface of the other said coupling means from an open end at one end of said other coupling means along an elongated intermediate portion thereof to a closed end comprising a seat for said cam follower means, the intermediate portion of said camming means comprising a relatively much longer section sloping from the closed end toward said one end of said other coupling means and a relatively much shorter reversely sloped section immediately adjacent the open end of said camming means, said sections of the intermediate portion of said camming means being so positioned that said input and output coupling means can be disconnected by continuous relative angular displacement during which said valve means is first engaged with said valve seat means and said projecting means is subsequently displaced from sealable engagement with said sealing means before said cam follower means traverses the reversely sloped section of said camming means.

6. A fluid pressure conduit coupling assembly comprising, in combination, an elongated generally circular first inlet coupling means having a first central bore therethrough, an annular valve seat means disposed within the first central bore intermediate the ends thereof, movable valve means retained within the first central bore biased against said valve seat means for closing said central bore to fluid flow therethrough, a generally circular second outlet coupling means having a second central bore therethrough and shaped for closely interfitting engagement with the first input coupling means, elongated projecting means secured at its base end to said outlet coupling means and positioned so that its other end subsequently engages and displaces said valve means from said valve seat means when said inlet coupling means and said outlet coupling means are operably interconnected to permit fluid flow through said conduit coupling assembly, coacting sealing means respectively secured to said input coupling means and said output coupling means positioned to be sealably mutually engaged to sealably interconnect said inlet coupling means and said outlet coupling means as said projecting means displaces said valve means and to be disengaged as said projecting means is withdrawn from engagement with said valve means, and releasable connecting means for operably interconnecting said input coupling means and said output coupling means including cam follower means projecting radially from one of said coupling means, and substantially elongated camming means for engagement with said cam follower means extending around the surface of the other said coupling means from an open end at one end of said other coupling means along an elongated intermediate portion to a closed end comprising a seat for said cam follower means, the intermediate portion of said camming means comprising a relatively much longer section sloping from the closed end toward said one end of said other coupling means and a relatively much shorter reversely sloped section immediately adjacent the open end of said camming means, said sections of the intermediate portion of said camming means being so positioned that said input and output coupling means can be disconnected by continuous relative angular displacement during which said valve means is seated upon said valve seat means and said coacting sealing means are displaced from sealable mutual engagement before said cam follower means traverses the reversely sloped section of said camming means.

References Cited in the file of this patent

UNITED STATES PATENTS

| | | |
|---|---|---|
| 2,676,613 | Baxter | Apr. 27, 1954 |
| 2,716,997 | Crookston | Sept. 6, 1955 |
| 2,730,382 | DeMastri | Jan. 10, 1956 |

FOREIGN PATENTS

| | | |
|---|---|---|
| 400,657 | Great Britain | Oct. 30, 1933 |
| 853,994 | Germany | Oct. 30, 1952 |
| 723,283 | Great Britain | Feb. 2, 1955 |